United States Patent Office  
3,123,646  
Patented Mar. 3, 1964

3,123,646  
PRIMARY ACYCLIC AMINES  
Nelson R. Easton, Indianapolis, Ind., assignor to Eli Lilly and Company, Indianapolis, Ind., a corporation of Indiana  
No Drawing. Filed June 2, 1960, Ser. No. 33,392  
5 Claims. (Cl. 260—583)

This invention relates to a group of novel primary amines and to their acid addition salts.

The primary amines provided by this invention can be represented by the following formula:

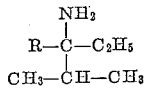

wherein R is ethyl, isopropyl, sec. butyl or t-butyl.

Nontoxic, pharmaceutically-acceptable, acid addition salts of the above amines bases are also included within the scope of this invention. Nontoxic, pharmaceutically-acceptable salts are those salts whose toxicity is not materially greater than that of the amine base from which they are derived. Examples of suitable acids which are useful in forming nontoxic, pharmaceutically-acceptable, acid addition salts with the primary amines represented by the above formula are hydrochloric acid, sulfuric acid, phosphoric acid, hydrobromic acid, maleic acid, citric acid, tartaric acid, benzoic acid, succinic acid, and the like. Illustrative acid addition salts of this invention include 3-amino-3-ethyl-4-methylpentane maleate, 3-amino-3-isopropyl-4-methylpentane tartrate, 3-amino-3-t-butyl-4-methylpentane hydrochloride, and 3-amino-2,4-dimethyl-3-ethylhexane sulfate.

The amine bases of this invention can be prepared by the series of reactions represented below, in which R has the same significance as it has in the above general formula.

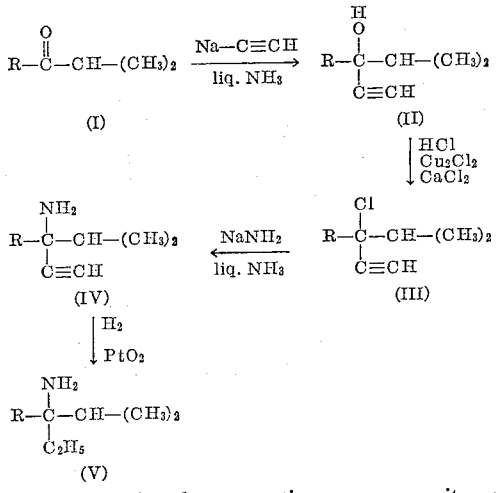

Referring to the above reaction sequences, it can be seen that a ketone having the formula

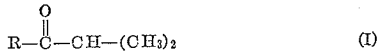

is reacted with sodium acetylide to form a hydroxy acetylene (II). The hydroxy acetylene is then reacted with hydrochloric acid in the presence of calcium chloride or other chloride salt to give the corresponding chloro-acetylene (III). The chloro-acetylene is in turn aminated with sodamide to yield an amino-acetylene (IV). Catalytic hydrogenation of the amino-acetylene thus prepared yields the primary amines (V).

The nontoxic, pharmaceutically-acceptable, acid addition salts of the amine bases of this invention are prepared by methods well known to the art. For example, the amine base can be dissolved in an organic solvent such as ether or alcohol, and an equivalent of the acid added thereto, preferably as a solution in the same solvent. The acid addition salt can be isolated by filtration if the salt is insoluble in the reaction mixture, or by evaporation of solvent in vacuo if the salt is soluble in the reaction mixture. Salts formed with volatile acids such as hydrochloric acid or hydrobromic acid, can be prepared by adding an excess of a solution of the acid to a solution of the amine or by passing the acid in gaseous form into the solution containing the amine base. Any excess of volatile acid can, of course, be readily removed by evaporation.

The primary amines of this invention, either in the form of the free bases or in the form of a nontoxic, pharmaceutically-acceptable, acid addition salt, are effective hypotensive agents. For use as hypotensive agents, the compounds can be administered orally.

This invention is further illustrated by the following specific examples.

EXAMPLE 1

*Preparation of 3-Amino-3-Isopropyl-4-Methylpentane*

46 g. of sodium are added to 3 l. of liquid ammonia while anhydrous acetylene gas is bubbled through the liquid ammonia solution, thus forming a mixture of sodium acetylide and liquid ammonia. Next, 228 g. of diisopropyl ketone are added to the ammonia mixture, while anhydrous acetylene gas is continuously bubbled into the reaction mixture. Acetylene gas is passed into the reaction mixture for an additional two hours. Two liters of ether are added and the reaction mixture is allowed to remain for about 16 hours at ambient room temperature, during which time the liquid ammonia evaporates. The remaining ether solution containing 3-hydroxy-3-isopropyl-4-methyl-1-pentyne formed in the above reaction is washed with two 500-ml. portions of water. The ethereal layer is separated and is dried, and the ether is removed by distillation in vacuo. 3-hydroxy-3-isopropyl-4-methyl-1-pentyne remaining as a residue is purified by distillation. It boils in the range of 80–83° C. at a pressure of about 28 mm. of mercury; $n_D^{25}=1.442$.

198 g. of 3-hydroxy-3-isopropyl-4-methyl-1-pentyne are mixed with 166 g. of calcium chloride and 1 g. of copper bronze powder. The reaction mixture is chilled to about 10° C., and 420 ml. of cold 12 N hydrochloric acid are added in 20-ml. portions with shaking. After the addition is completed, the reaction mixture is allowed to remain at about 10° C. for about 30 minutes and then for an additional hour at ambient room temperature. The organic layer is separated and is washed with 400 ml. of water followed by 400 ml. of a saturated sodium bicarbonate solution. The residue containing 3-chloro-3-isopropyl-4-methyl-1-pentyne formed in the above reaction is purified by steam distillation. Distillation in vacuo of the collected steam distillate yields purified 3-chloro-3-isopropyl-4-methyl-1-pentyne boiling in the range of 94–110° C. at a pressure of about 55 mm. of mercury; $n_D^{25}=1.452$.

27 g. of sodium are dissolved in 2 l. of liquid ammonia containing a trace of ferric chloride, thus forming sodamide. 166 g. of 3-chloro-3-isopropyl-4-methyl-1-pentyne are dissolved in 500 l. of ether, and the solution is added dropwise to the mixture of sodamide and liquid ammonia. The reaction mixture is kept at ambient room temperature for about 16 hours, during which time the liquid ammonia evaporates. 200 ml. of water are added, the ether layer containing 3-amino-3-isopropyl-4-methyl-1-pentyne is separated and is dried. The ether layer is made acidic by an addition of an excess of saturated alcoholic hydrogen chloride, thus forming 3-amino-3-isopropyl-4-methyl-1-pentyne hydrochloride, which is separated by filtration. Recrystallization of the filter cake from isopropyl alcohol yields purified 3-amino-3-isopropyl-4-methyl-1-pentyne hydrochloride melting at about 257–259° C.

*Analysis.*—Calc.: N, 7.97. Found: N, 7.93.

6 g. of 3-amino-3-isopropyl-4-methyl-1-pentyne hydrochloride are dissolved in 190 ml. of ethanol containing 10 ml. of saturated alcoholic hydrogen chloride. 25 mg. of platinum oxide are added and the mixture is hydrogenated at a hydrogen pressure of about 45 p.s.i. in a low-pressure hydrogenation apparatus. After the uptake of hydrogen has ceased, the hydrogenation mixture is removed from the hydrogenation apparatus, the catalyst is separated by filtration, and the filtrate is concentrated by evaporation in vacuo, yielding as a residue 3-amino-3-isopropyl-4-methyl-pentane hydrochloride formed in the above reaction. Recrystallization of the residue from a mixture of ethanol and ethyl acetate yields purified 3-amino-3-isopropyl-4-methylpentane hydrochloride melting at about 275° C.

*Analysis.*—Calc.: N, 7.79; Cl, 19.73; C, 60.14; H, 12.34. Found: N, 7.53; Cl, 20.18; C, 59.85; H, 12.26.

5 g. of 3-amino-3-isopropyl-4-methylpentane hydrochloride are dissolved in water. An excess of a saturated solution of sodium bicarbonate is added, thus forming a 3-amino-3-isopropyl-4-methylpentane free base, which is taken up in ether. The ether solution is separated and is dried. Evaporation of the ether in vacuo yields 3-amino-3-isopropyl-4-methylpentane.

EXAMPLE 2

*Preparation of 3-Amino-3-Ethyl-4-Methylpentane*

Following the procedure of Example 1, sodium acetylide is formed by adding 43.2 g. of sodium to about 3 l. of liquid ammonia while acetylene gas is simultaneously being bubbled into the liquid ammonia. A solution of 187.7 g. of isopropyl ethyl ketone in 200 ml. of anhydrous ether are added, thus forming 3-hydroxy-3-ethyl-4-methyl-1-pentyne. The compound is isolated and purified by the procedure of Example 1. 3-hydroxy-3-ethyl-4-methyl-1-pentyne thus prepared distills in the range of 69–70° C. at a pressure of about 34 mm. of mercury; $n_D^{25} = 1.439$.

Following the procedure of Example 1, 600 ml. of 12 N hydrochloric acid are cooled to about 0° C. 76 g. of calcium chloride, 54.2 g. of cuprous chloride, and 1 g. of copper bronze powder are added to the hydrochloric acid. 172.3 g. of 3-hydroxy-3-ethyl-4-methyl-1-pentyne are added to the chilled mixture with stirring. 3-chloro-3-ethyl-4-methyl-1-pentyne thus prepared is isolated and purified by the procedure of Example 1. The compound distills in the range of 67–68° C. at a pressure of about 36 mm. of mercury; $n_D^{25} = 1.450$.

*Analysis.*—Calc.: C, 66.5; H, 9.0; Cl, 24.5. Found: C, 66.58; H, 9.07; Cl, 24.70.

Still following the procedure of Example 1, 9.2 g. of sodium are added to 3 l. of liquid ammonia containing a trace of ferric chloride, thus forming sodamide. 50 g. of 3-chloro-3-ethyl-4-methyl-1-pentyne are added in dropwise fashion followed by 1 l. of anhydrous ether. The reaction is stirred at ambient room temperature for about 14 hours, during which time the ammonia disappears by evaporation. The remaining ether solution is washed twice with 200-ml. portions of water and is then dried. The dried ether solution is made acidic with an excess of saturated alcoholic hydrogen chloride. The solvents are removed by evaporation in vacuo, leaving a crystalline residue of 3-amino-3-ethyl-4-methyl-1-pentyne hydrochloride. The compound melts at about 272–275° C. after recrystallization from an isopropyl alcohol-methyl ethyl ketone-ethyl ether solvent mixture.

31 g. of 3-amino-3-ethyl-4-methyl-1-pentyne hydrochloride are hydrogenated by the method of Example 1, using 150 ml. of anhydrous ethanol as a solvent, 300 mg. of platinum oxide as a catalyst, and a hydrogen pressure of 42 p.s.i. 3-amino-3-ethyl-4-methylpentane hydrochloride produced in the above hydrogenation is isolated by the method of Example 1. It melts at about 286–288° C. with decomposition after recrystallization from a mixture of methyl ethyl ketone and ethyl acetate.

*Analysis.*—Calc.: N, 8.45. Found: N, 8.42.

3-amino-3-ethyl-4-methylpentane free base is prepared from the hydrochloride salt by the method of Example 1.

3-amino-3-t-butyl-4-methylpentane and 3-amino-3-isopropyl-4-methylhexane are prepared according to the above reaction sequence by using isopropyl-t-butyl ketone and isopropyl sec.-butyl ketone, respectively, as starting materials in place of ethyl isopropyl ketone as in the above example.

I claim:

1. A compound selected from the class consisting of a primary amine and its salts formed with nontoxic, pharmaceutically-acceptable acids, said primary amine being represented by the following formula:

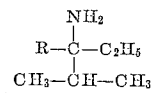

wherein R is a radical of the group consisting of ethyl, isopropyl, sec. butyl and t-butyl.
2. 3-amino-3-isopropyl-4-methylpentane.
3. 3-amino-3-isopropyl-4-methylpentane hydrochloride.
4. 3-amino-3-ethyl-4-methylpentane.
5. 3-amino-3-ethyl-4-methylpentane hydrochloride.

References Cited in the file of this patent
UNITED STATES PATENTS

| | | |
|---|---|---|
| 2,457,660 | Gresham et al. | Dec. 28, 1948 |
| 2,480,266 | Schmerling | Aug. 30, 1949 |